US008219400B2

(12) United States Patent
Chu

(10) Patent No.: US 8,219,400 B2
(45) Date of Patent: Jul. 10, 2012

(54) STEREO TO MONO CONVERSION FOR VOICE CONFERENCING

(75) Inventor: Peter L. Chu, Lexington, MA (US)

(73) Assignee: Polycom, Inc., Pleasanton, CA (US)

( * ) Notice: Subject to any disclaimer, the term of this patent is extended or adjusted under 35 U.S.C. 154(b) by 887 days.

(21) Appl. No.: 12/275,393

(22) Filed: Nov. 21, 2008

(65) Prior Publication Data

US 2010/0131278 A1 May 27, 2010

(51) Int. Cl.
*G10L 11/00* (2006.01)
(52) U.S. Cl. ......... 704/270; 704/278; 704/201; 704/200
(58) Field of Classification Search .................. 704/270, 704/278, 201, 200
See application file for complete search history.

(56) References Cited

U.S. PATENT DOCUMENTS

| 5,828,756 | A | 10/1998 | Benesty et al. |
| 6,178,237 | B1 * | 1/2001 | Horn ........................ 379/202.01 |
| 6,408,327 | B1 * | 6/2002 | McClennon et al. ......... 709/204 |
| 6,453,285 | B1 | 9/2002 | Anderson et al. |
| 6,850,496 | B1 * | 2/2005 | Knappe et al. ................. 370/260 |
| 6,931,123 | B1 * | 8/2005 | Hughes .................... 379/406.01 |
| 7,089,285 | B1 | 8/2006 | Drell |
| 7,315,619 | B2 | 1/2008 | Marton et al. |
| 2003/0129956 | A1 * | 7/2003 | Virolainen .................... 455/306 |
| 2005/0018039 | A1 * | 1/2005 | Lucioni ....................... 348/14.01 |
| 2006/0023871 | A1 * | 2/2006 | Shaffer et al. ............ 379/420.01 |
| 2007/0025538 | A1 * | 2/2007 | Jarske et al. ............. 379/202.01 |

OTHER PUBLICATIONS

Polycom, Inc.; "Polycom SoundStation VTX 1000;" Product Brochure; copyright 2003.
Polycom, Inc.; "Polycom SoundStation VTX 1000;" User's Guide and Administrator's Guide; copyright 2003; p. 3.

* cited by examiner

*Primary Examiner* — Qi Han
(74) *Attorney, Agent, or Firm* — Wong, Cabello, Lutsch, Rutherford & Bruculerri, LLP

(57) ABSTRACT

Stereo to mono voice conferencing conversion is performed during a voice conference. Conferencing equipment receives audio for right and left channels and filters each of the channels into a plurality of bands. For each band of each channel, the equipment determines an energy level and compares each energy level for each band of the right channel to each energy level for each corresponding band of the left channel. Based on the comparison, the equipment determines which channel has more audio resulting from speech. Based on the determination, the equipment adjusts delivery of the audio from the right and left channels to a mono channel for transmission to endpoints only capable of mono audio in the voice conference.

30 Claims, 3 Drawing Sheets

STEREO TO MONO CONVERSION FOR VOICE CONFERENCING

BACKGROUND

Several audio problems may occur during voice conferencing. For example, voice conferencing equipment having only mono audio capabilities may have more than one microphone coupled to the equipment's mono input. Because the microphones may be arbitrarily positioned, problems may arise when one of the microphones is "idle"—i.e., not near the participants. If input audio picked up from such an "idle" microphone is used in the mono input during the conference, then the resulting mono output may have undesirable noise or reverberance. To deal with this problem, Polycom's VTX 1000 is a conference phone that can automatically select which microphone is active during the conference so that only one of the phone's microphones is "on" at a time.

Another audio problem encountered in voice conferencing arises when there is a disparity between stereo and mono audio capabilities of the conferencing equipment. For example, endpoints in a multi-way call may have different types of conferencing equipment. Some of the endpoints may have stereo audio capability (left and right audio channels) while others may only have mono audio capability (a single audio channel). For the mono endpoints to transmit stereo audio, the mono audio must be converted to stereo. This mono to stereo conversion can easily be done by duplicating the mono channel in both left and right stereo channels.

On the other hand, for the mono endpoint to receive stereo audio, the stereo must be converted to mono. In the conventional approach of converting stereo to mono, the left and right stereo channels are simply added together to produce a summed mono channel. However, this conversion usually results in quality degradation in voice conferencing applications. For example, the left channel may primarily contain audio of a person talking while the right channel contains echoes of the talker and other noise. In such a situation, converting the stereo to mono by simply adding the left and right channels together will degrade the audio quality because the noise and reverberance from the right channel will have been directly merged with the left channel.

What is needed, therefore, is an approach that can convert stereo to mono without quality degradation during a voice conference.

SUMMARY

Stereo to mono voice conferencing conversion is performed during a voice conference. Conferencing equipment receives audio for separate right and left stereo channels, determines from the audio which one of the channels has more audio resulting from voice than the other channel, and then adjusts delivery of the audio for the channels to a mono channel based on the determination.

In one implementation, after receiving the audio for the right and left stereo channels, the equipment filters each of the channels into a plurality of bands and can use a filterbank having bandpass filters to filter each channel into the bands. For each band of each channel, the equipment then determines an energy level. To remove audio that may be caused by low level noise or reverberance and to focus primarily on audio resulting from voice, the equipment can compare the energy level of each band to a threshold level and ignore those that are not above the threshold. The equipment can also determine a running peak for each of the energy levels above the threshold so the equipment can perform its analysis based on averages over time instead of instantaneous values.

With the energy levels determined, the equipment compares each energy level for each band of the right channel to each energy level for each corresponding band of the left channel to determine which of the channels has a majority of bands with greater energy levels. Based on the comparison, the equipment then adjusts delivery of the audio from the right and left channels to a mono channel. For example, if the equipment determines that the right channel has more bands with greater energy levels than the corresponding bands of the left channel, then the equipment adjusts a fader feeding the two channels into the mono channel so that more of the right channel is added to the mono channel than the left channel. This will reduce audio degradation in the resulting mono channel by keeping out noise and reverberance that may come from the left channel's audio input. Ultimately, the audio for the mono channel can be sent to remote mono endpoints or can be sent to the equipment's local speakers if the equipment is set up as a mono endpoint.

The foregoing summary is not intended to summarize each potential embodiment or every aspect of the present disclosure.

DETAILED DESCRIPTION

Figure 1:
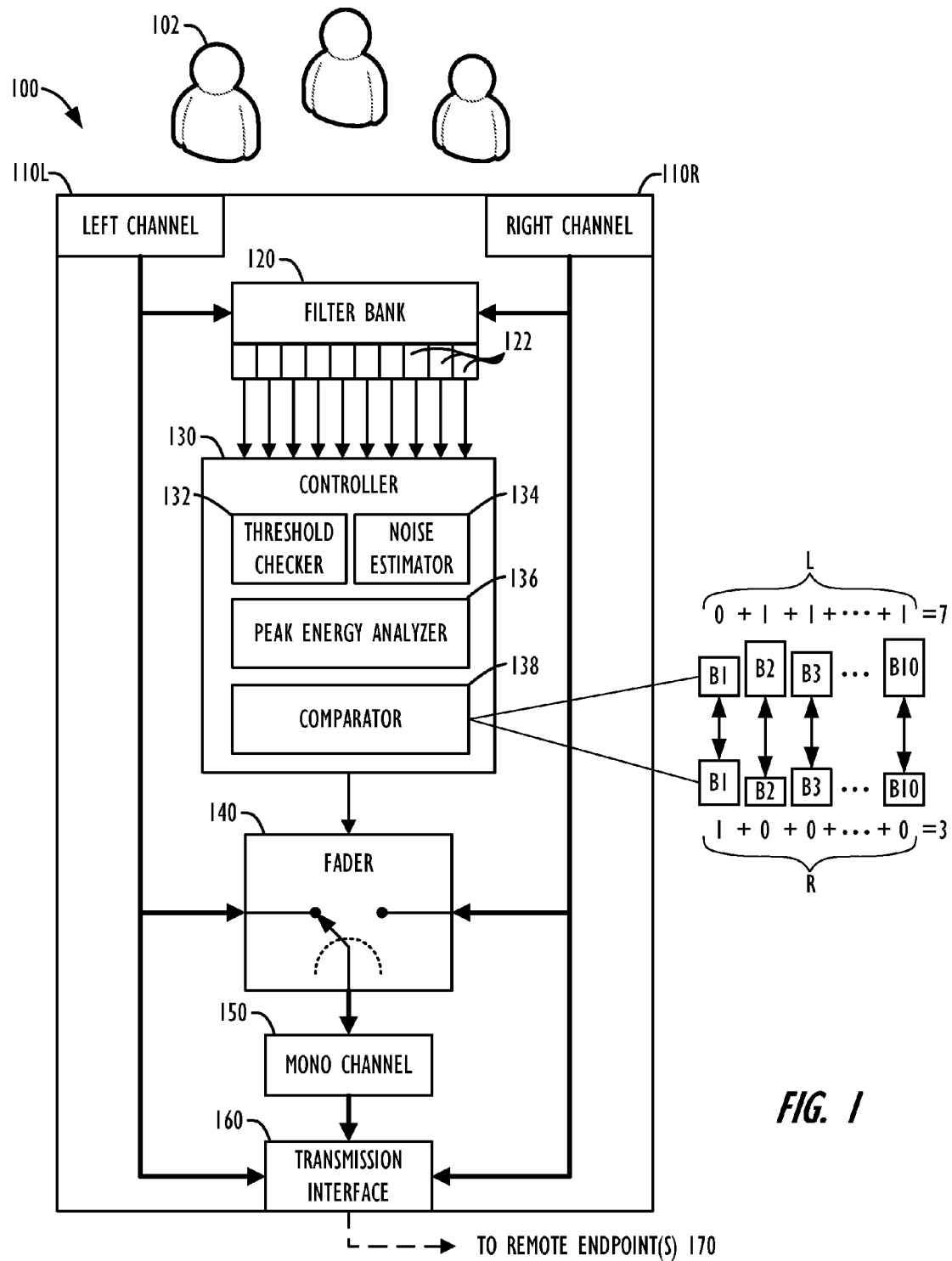
FIG. 1 illustrates a conferencing system according to certain teachings of the present disclosure.

Voice conferencing equipment 100 schematically illustrated in FIG. 1 can be part of a teleconferencing system or a videoconferencing system used for voice conferencing between participants 102 and remote endpoints 170. As shown in FIG. 1, the equipment 100 can have stereo capabilities with right and left audio channels 110L-R. Each of these channels 110L-R use one or more microphones (not shown) and receive separate input audio from the participants 102. As is typical, the various participants 102 in the conference may be positioned arbitrarily around the equipment 100 at different locations relative to the stereo channels' microphones (not shown).

Typically, one participant 102 may usually be talking at a time during the conference. To conference with remote endpoints 170 capable of providing stereo audio, the equipment 100 simply transmits audio signals from the separate channels 110L-R via a transmission interface 160 to be reproduced in stereo at such stereo endpoints. However, some of the endpoints participating in the voice conference may only be capable of providing mono audio. Thus, the best audio for transmitting the talking participant's voice to such mono endpoints 170 will typically come from either the left or right channel 110L-R. To handle this situation, the equipment 100 dynamically decides which of the separate channels 110L-R is the better channel to use for mono audio transmission to the mono endpoints 170 during the voice conference. In this way, as different participants 102 speak, the best channel for mono audio transmission can be switched from left to right or vice-versa so that a smooth fading can occur during this transition with reduced degradation in audio quality for the mono endpoints 170.

Figure 2:
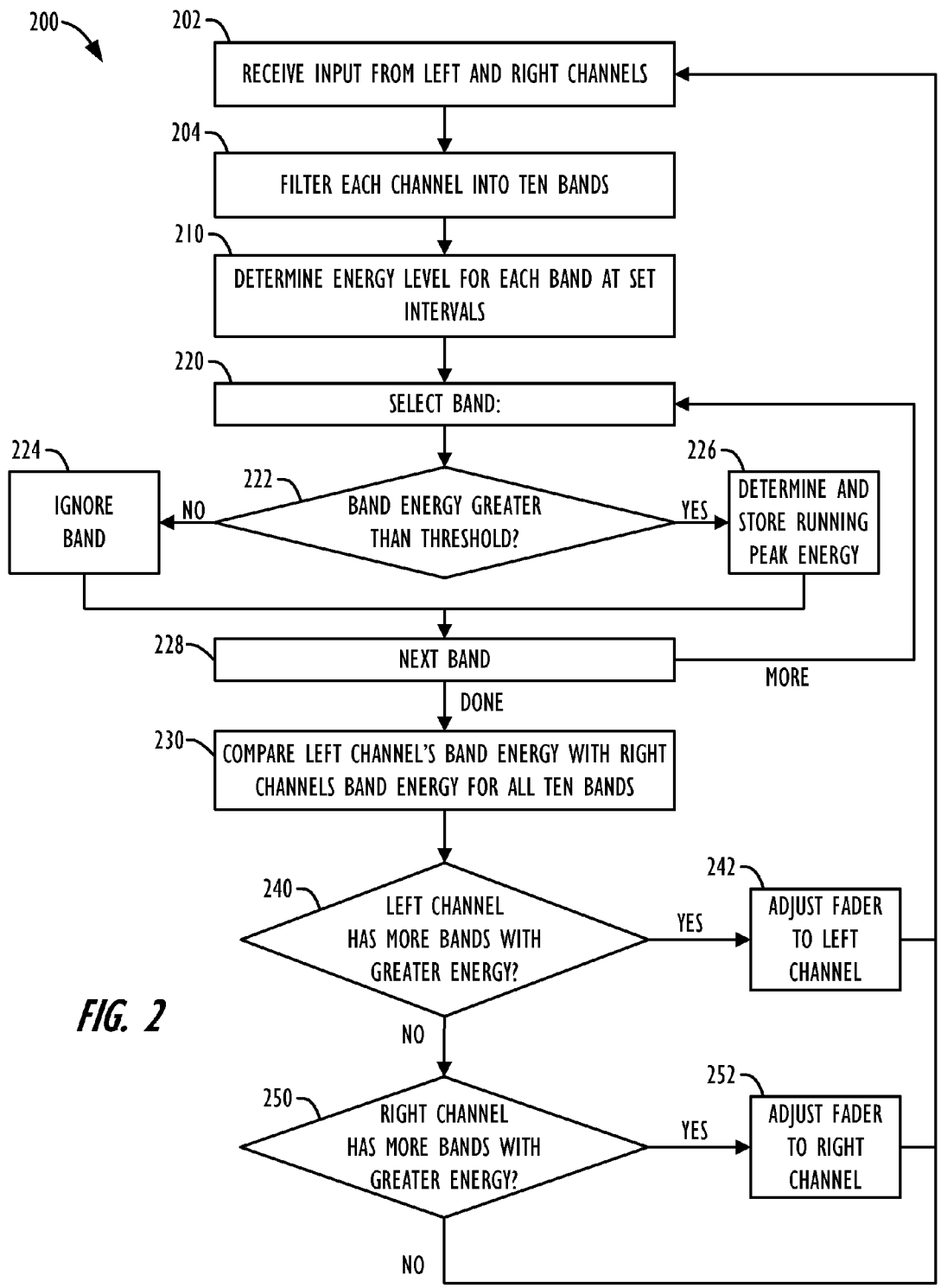
FIG. 2 illustrates a process in flowchart form for converting stereo to mono in a conferencing system.

The voice conferencing equipment 100 can be operated according to a process in FIG. 2 for converting stereo audio input into mono audio output. (As shown in FIG. 1, the audio from the mono channel can then be transmitted to remote endpoints having only mono audio capabilities.) Discussing FIGS. 1 and 2 concurrently, the equipment 100 has left and right audio channels 110L-R that each can include one or more microphones. These channels 110L-R receive audio such as speech from various conferencing participants 102, although other noise and reverberance can be picked up by the channels 110L-R (Block 202). A filterbank 120 receives audio input from the channels 110L-R and uses a plurality of bandpass filters 122 to filter each of the channels 110L-R into separate bands. In one example, the filterbank 120 may have ten bandpass filters 122 for filtering each channel 110L-R into ten bands. The audio range of interest can span from 1 kHz to 3 k-Hz so each of the ten bands can cover about 200-Hz.

A controller 130 receives the separate bands for each channel and determines energy levels for each band (Block 210). This determination can be performed at set intervals during the conference, e.g., every 20-ms. Selecting a band for one of the channels, the controller 130 then determines if the selected band's energy is greater than a threshold (Blocks 220-222). This determination can be performed by a threshold checker algorithm 132 of the controller 130. In one implementation, the threshold can be set to a fixed value so that undesirable low level sounds occurring in the bands will be ignored altogether in the analysis. The threshold's value is selected so that audio substantially related to speech can be isolated from low level sounds that may occur during the voice conference. In another implementation, the threshold can be dynamically set using a noise estimator algorithm 134 that maintains a running minimum of low level noise over time that is used to set the threshold.

If the selected band's energy is less than the threshold, then the band is ignored and may be given an energy level of zero (Block 224). Then, the next band is selected for the given channel (Block 228). If the band's energy, however, is greater than the threshold, then the controller 130 finds the running peak of the band's energy and stores this for later analysis discussed below (Block 226). A peak energy analyzer algorithm 136 can determine the running peak energy level. Because the band's energy level may fluctuate significantly, using the running peak of the band's energy can help the equipment 100 to dynamically react to changes over time with reliable measurements that do not overly fluctuate and that tend to decay slowly over time. Once a running peak energy level has been determined, the next band is then selected for the given channel (Block 228).

The threshold comparisons are repeated so that each band for each channel has been selected, compared to the threshold, and stored with a running peak energy level (Blocks 220-228). Once completed, the controller 130 compares the running peak energy levels for each of the left channel's bands with the running peak energy levels for each corresponding right channel band (Block 230). The comparison can be performed by a comparator algorithm 138 of the controller 130 that compares each corresponding band of each channel to determine which has a greater energy level. As schematically shown to the right in FIG. 1, the number of bands for each channel having the greater energy level in the comparisons is summed together. For example, the left channel (L) is shown having seven bands with greater peak energy levels than the right channel (R) having only three.

Based on the comparisons, the comparator algorithm 138 selects the channel having more bands with greater energy levels as the channel to provide at least a major proportion of audio for the mono channel 150 (Blocks 240-242 & 250-252). In one implementation involving ten bands, at least seven or more of the bands for a channel must have a greater energy level in order for that channel to be selected for more inclusion into the mono channel 150. For example, if more than seven bands for the left channel 110L have greater energy levels than the right channel's bands, then the comparator algorithm 138 chooses the left channel for more inclusion into the mono channel 150 and adjusts the fader 140 to favor the left channel 110L (Blocks 240-242). If, however, more than seven bands for the right channel 110R have greater energy levels than the left channel's bands, then the comparator algorithm 138 chooses the right channel for more inclusion into the mono channel 150 and adjusts the fader 140 to favor the right channel 110R (Blocks 250-252). Otherwise, the current arrangement of audio input is left unchanged. In any event, processing returns to receiving input (Block 202) so that the audio can be filtered into bands and energy levels of the bands can be determined at the set interval as described above so the process 200 can be repeated.

When adjusting the audio based on which channel has more bands with greater energy levels (i.e., has more audio from speech), the fader 140 applies selected proportions of the left and right channels to the mono channel 150 and adjusts those proportions over time to make the transition between channel gradual over time. In particular, the fader 140 as software adds two weighted proportions of the two channels together for the mono channel 150 and dynamically adjusts those weighted proportions of each channel's amplitudes over time. This dynamic adjustment can avoid rapid changes in the audio of the mono channel that could produce undesirable clicking. If, for example, the right channel is selected as having more bands with greater energy levels (because a participant near the right channel is currently talking), then the fader 140 increases the right channel's amplitude a proportional amount and decreases the left channel's amplitude a corresponding amount. Then, the fader 140 adjusts these proportional amounts several times over a time period—e.g., of about 4-ms or so—to make the transition between channels occur gradually.

Ultimately, the equipment 100 uses the mono channel 150 to transmit mono audio to remote endpoints via a transmission interface 160 so that those endpoints only capable of handling mono audio can receive mono audio with reduced degradation as disclosed herein. Of course, the transmission interface 160 can also send the stereo audio from both the right and left channels 110L-R so that remote endpoints capable of handling stereo can receive stereo audio. In this way, the equipment 100 can enhance the audio quality in multi-way stereo/mono calls in which one or more mono endpoints participate. This situation arises frequently, for example, in a stereo videoconferencing call between Polycom's VSX or HDX videoconferencing systems when a mono Plain Old Telephone Service (POTS) telephone call is added to the conference. The audio that the mono POTS endpoint hears will be significantly enhanced by the processing disclosed herein. Moreover, even where noise and reverberance are equal in the left and right channels 110L-R, the disclosed equipment 100 and process 200 can yield an improvement of 3 dB in signal-to-noise and signal-to-reverberance ratios over the prior art.

Figure 3:
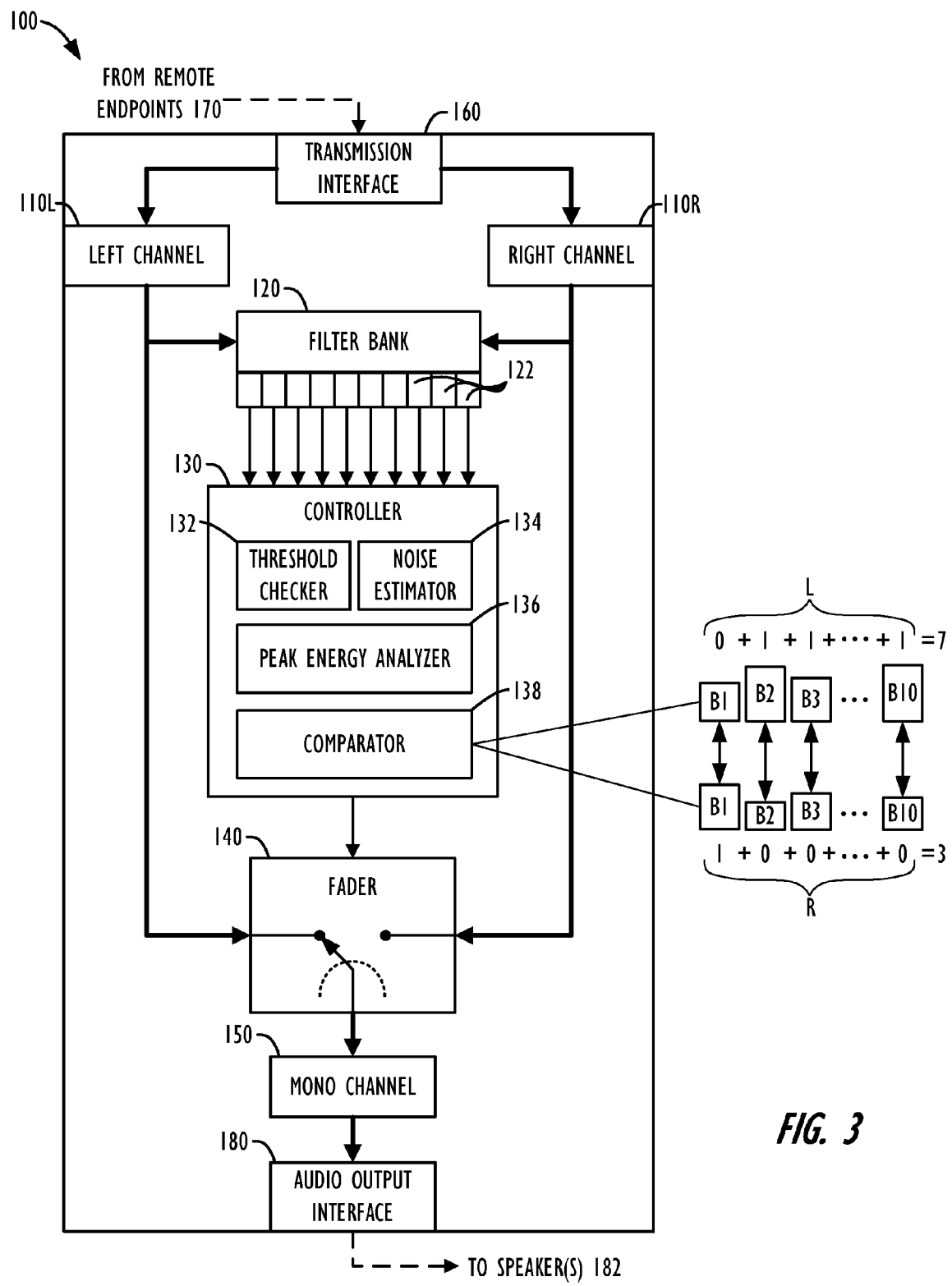
FIG. 3 illustrates the conferencing system in another arrangement according to certain teachings of the present disclosure.

In a different arrangement shown in FIG. 3, the equipment 100 is capable of receiving stereo audio input from remote endpoints 170 via the transmission interface 160. However, the equipment 100 is set up to provide mono audio output from its mono channel 150 via an audio output interface 180 and one or more speakers 182. For example, the equipment 100 may be incapable of providing stereo output altogether and may simply receive the stereo audio input from a stereo source that must be converted by the equipment 100 to mono for output to the equipment's speakers 182. Alternatively, the equipment 100 may be capable of providing stereo output, but it may have been set up for mono operation or to use only one speaker 182, such as an internal speaker, rather than auxiliary stereo speakers.

In any event, the equipment 100 in FIG. 3 operates in a manner similar to that described previously in FIG. 2. Briefly, the equipment 100 receives stereo audio input from endpoints 170 via the transmission interface 160 (Block 202). To then convert the stereo audio from the separate left and right channels 110L-R to the mono channel 150, the equipment 100 uses the filterbank 120, the controller 130, and the fader 140 according to the remaining processing steps of FIG. 2. Ultimately, the equipment 100 has converted the stereo into mono for the mono channel 150 so that audio can then be delivered to the one or more speakers 182 via the equipment's audio output interface 180. Again, the mono audio output will benefit from less degradation using the techniques disclosed herein by adjusting the delivery of the audio from the two channels 110L-R to the mono channel 150 based on which of the channels 110L-R has more audio resulting from voice.

The foregoing description of preferred and other embodiments is not intended to limit or restrict the scope or applicability of the inventive concepts conceived of by the Applicants. For example, although discussed in terms of voice conferencing equipment such as used for teleconferencing and videoconferencing, the disclosed techniques can apply to any type of equipment involving voice audio and the need to convert stereo to mono to reduce audio degradation. In another example, although discussed in terms of stereo audio having separate right and left channels, the techniques of the present disclosure can equally apply to equipment having at least two or more separate channels that need to be converted to a mono channel. For instance, the equipment may be capable of handling surround sound involving more than two separate audio channels. Using the techniques disclosed herein, the audio from the multiple channels can be delivered to a mono channel based on the same determinations, comparisons, and adjustments discussed above with reference to stereo audio.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A voice conferencing method implementable by voice conferencing equipment, the method comprising:
   receiving input audio at voice conferencing equipment for at least two input channels;
   determining from the input audio which one of the at least two input channels has a greater amount of voice-indicative audio by comparing the input audio of the at least two input channels with the voice conferencing equipment; and
   adjusting with the voice conferencing equipment a delivery of the input audio of the at least two input channels as output audio for a mono output channel based on the determination.

2. The method of claim 1, wherein the act of adjusting the delivery of the input audio comprises:
   weighting each of the at least two input channels based on the determination, and
   adjusting the delivery of the input audio of the at least two input channels as the output audio for the mono output channel proportionately based on the weightings over a period of time.

3. The method of claim 1, wherein the act of determining which one of the at least two input channels has the greater amount of voice-indicative audio comprises filtering each of the at least two input channels into a plurality of bands.

4. The method of claim 3, wherein the act of determining which one of the at least two input channels has the greater amount of voice-indicative audio comprises determining an energy level for each band of each input channel.

5. The method of claim 4, further comprising ignoring any of the bands that do not have an energy level at least greater than a threshold level.

6. The method of claim 4, wherein the act of determining an energy level comprises determining a running peak energy level over a period of time.

7. The method of claim 4, wherein the act of determining which one of the at least two input channels has the greater amount of voice-indicative audio comprises determining whether a majority of the bands for one of the at least two input channels has greater energy levels than the corresponding bands of the other of the at least two input channels by comparing each energy level for each band of the one input channel to each energy level for each corresponding band of the other of the at least two input channels.

8. The method of claim 7, wherein the act of adjusting the delivery comprises selecting the one input channel having the majority of greater energy levels as a selected input channel to provide at least a major proportion of the output audio for the mono output channel.

9. The method of claim 8, wherein the act of adjusting the delivery comprises increasing amplitude of the selected input channel over time, and decreasing amplitude of the other of the at least two input channels proportionately over time.

10. The method of claim 1, further comprising sending the output audio from the mono output channel of the voice conferencing equipment to one or more remote endpoints.

11. The method of claim 1, further comprising sending the output audio from the mono output channel to one or more speakers coupled to the voice conferencing equipment.

12. A program storage device, readable by voice conferencing equipment, comprising instructions stored on the program storage device for causing the voice conferencing equipment to perform a method according to claim 1.

13. A stereo to mono voice conferencing conversion method implementable by voice conferencing equipment, the method comprising:
   receiving input audio at voice conferencing equipment for stereo input channels;
   filtering the input audio of each of the stereo input channels into a plurality of bands;
   determining an energy level for each of the bands of each of the stereo input channels;
   determining which one of the stereo input channels has more bands with greater energy levels than the other of the stereo input channels; and
   adjusting with the voice conferencing equipment a delivery of the input audio of the stereo input channels as output audio for a mono output channel based on the determination.

14. The method of claim 13, wherein the act of determining an energy level comprises determining a running peak energy level for each of the bands of each of the stereo input channels.

15. The method of claim 13, wherein the act of determining which one of the stereo input channels has more bands with the greater energy levels comprises comparing each energy level for each band of one of the stereo input channels to each energy level for each corresponding band of the other of the stereo input channels.

16. The method of claim 15, wherein the act of determining which one of the stereo input channels has more bands with the greater energy levels comprises determining whether a majority of the bands for the one of the stereo input channels has greater energy levels than the corresponding bands of the other of the stereo input channels.

17. The method of claim 16, wherein the act of adjusting the delivery comprises selecting the stereo input channel having the majority of greater energy levels as a selected stereo input channel to provide at least a major proportion of the output audio for the mono output channel.

18. The method of claim 17, wherein the act of adjusting the delivery comprises increasing amplitude of the selected stereo input channel over time, and decreasing amplitude of the other stereo input channel proportionately over time.

19. The method of claim 13, further comprising sending the output audio from the mono output channel of the voice conferencing equipment to one or more remote endpoints.

20. The method of claim 13, further comprising sending the output audio from the mono output channel to one or more speakers coupled to the voice conferencing equipment.

21. Voice conferencing equipment, comprising:
at least two input channels receiving input audio; and
a controller operatively coupled to the at least two input channels and operable to
compare the input audio of the at least two input channels,
determine from the comparison which one of the at least two input channels has a greater amount of voice-indicative audio, and
adjust a delivery of the input audio from the at least two input channels as output audio for a mono output channel based on the determination.

22. The equipment of claim 21, wherein to adjust delivery of the input audio, the controller is operable to:
weight each of the at least two input channels based on the determination, and
adjust delivery of the input audio of the at least two input channels as the output audio for the mono output channel proportionally based on the weightings over time.

23. The equipment of claim 21, further comprising a plurality of bandpass filters filtering each of the at least two input channels into a plurality of bands.

24. The equipment of claim 23, wherein to determine which one of the at least two input channels has the greater amount of voice-indicative audio, the controller is operable to determine an energy level for each band of each input channel.

25. The equipment of claim 24, wherein to determine energy levels, the controller is operable to determine a running peak energy level over a time period.

26. The equipment of claim 24, wherein to compare the at least two input channels and determine which one of the at least two input channels has the greater amount of voice-indicative audio, the controller is operable to
compare each energy level for each band of each input channel to each energy level for each corresponding band of the other of the at least two input channels, and
determine whether a majority of the bands for one of the at least two input channels has greater energy levels than the corresponding bands of the other of the at least two input channels.

27. The equipment of claim 26, wherein to adjust the delivery, the controller is operable to select the one input channel having the majority of greater energy levels as a selected input channel to provide at least a major proportion of the output audio for the mono output channel.

28. The equipment of claim 27, wherein to adjust the delivery, the controller is operable to
increase amplitude of the selected input channel over time, and
decrease amplitude of the other of the at least two input channels proportionally over time.

29. The equipment of claim 21, further comprising a transmission interface operatively coupled to the controller and sending the output audio from the mono output channel to one or more remote endpoints.

30. The equipment of claim 21, further comprising an audio output interface operatively coupled to the controller and sending the output audio from the mono output channel to one or more speakers coupled to the voice conferencing equipment.

* * * * *